United States Patent
Levien

[11] Patent Number: 6,097,855
[45] Date of Patent: Aug. 1, 2000

[54] METHOD AND APPARATUS FOR IMAGE ROTATION

[76] Inventor: Raphael L. Levien, P.O. Box 31, McDowell, Va. 24458

[21] Appl. No.: 08/019,783

[22] Filed: Feb. 19, 1993

[51] Int. Cl.[7] .................................................... G06K 9/32
[52] U.S. Cl. ........................................ 382/296; 382/300
[58] Field of Search ................................ 382/44, 46, 41, 382/296, 300, 298; 348/44, 45; 364/723, 715.07, 715.08

[56] References Cited

U.S. PATENT DOCUMENTS

| | | | |
|---|---|---|---|
| 3,432,674 | 3/1969 | Hobrough | 382/44 |
| 4,437,121 | 3/1984 | Taylor et al. | 358/160 |
| 4,463,372 | 7/1984 | Bennett et al. | |
| 4,468,688 | 8/1984 | Gabriel et al. | |
| 4,472,732 | 9/1984 | Bennett et al. | |
| 4,611,232 | 9/1986 | Searby | 358/160 |
| 4,618,991 | 10/1986 | Tabata et al. | 382/46 |
| 4,637,057 | 1/1987 | Kermiseh | 382/46 |
| 4,712,185 | 12/1987 | Aoki | 364/518 |
| 4,759,076 | 7/1988 | Tanaka et al. | 382/46 |
| 4,835,532 | 5/1989 | Fant | 340/728 |
| 5,050,225 | 9/1991 | Itoh | 382/46 |

OTHER PUBLICATIONS

"Digital Image Warping", George Wolberg IEEE Computer Society press.

*Primary Examiner*—Joseph Mancuso
*Attorney, Agent, or Firm*—Allan Jacobson

[57] ABSTRACT

An image rotation system includes a method and apparatus for rotating an image by skewing the image in both the vertical and horizontal directions, and interpolating the image in both the vertical and horizontal directions. A rough vertical skew is performed prior to horizontal skew and prior to any interpolation. Thereafter, more complex processing operations are carried using horizontal scan line pixel streams exclusively. In particular, the horizontal stream processing achieves vertical interpolation, horizontal interpolation corrected for the rough vertical skew, and a fine vertical skew adjustment.

32 Claims, 9 Drawing Sheets

METHOD AND APPARATUS FOR IMAGE ROTATION

FIELD OF THE INVENTION

The present invention relates to image processing, and in particular the present invention relates to a system method and apparatus for linear transformation, interpolation, and screening of images.

BACKGROUND OF THE INVENTION

Linear transformation consists of rotation, scaling, anamorphic distortion, and shearing. Interpolation is smoothing the transitions between pixels, while screening is the preparation of continuous tone images into bilevel halftones composed of dots. Halftone screening allows continuous tone images to be printed on typical printing devices where the absence or presence of the ink on the paper is used to represent the printed image. In order to represent halftones (shades between the presence or absence of the printed ink), the original image is screened to produce a pattern, such a variable size dots which appear to the human eye as a halftone image. Thus, screening tends to increase the number of output image pixels as compared to the original input image. In general, the larger number of pixels in an image increases the burden of image processing hardware and software, making processing speed per pixel a critical system limitation.

In a copending patent application, Ser. No. 748,948, filed Aug. 23, 1991 to the present inventor, entitled "HIGH SPEED SCREENING OF IMAGES", a system and method is disclosed for generating microcode for enlarging an image by any desired enlargement ratio, and combining the enlarged image with a halftone screen cell to produce a halftone screened image. The enlargement process and halftone screening steps are combined in a continuous efficient process to produce a halftone image output. However, in addition to enlarging and screening an image, it is often desirable to be able to rotate the image to any desired angle.

Image rotation techniques are well known. In one prior art direct approach, a new location is calculated for each pixel by appropriate trigonometric function, thereby rotating the image through the desired angle. However, the direct calculation approach is much too slow for use in screening stored images in which each output pixel is computed from a scanned input image as the source image. Direct calculation of a rotated image can require several seconds per image scan line.

In another technique, known in the prior art, image rotation is achieved by skewing the image in the horizontal direction (along the X axis), and then skewing the image in the vertical direction (along the Y axis). However, skewing tends to produce jagged line edges, like a staircase. To smooth the transitions between pixels of the rotated image, interpolation is used to add pixels to the rotated image. Thus, in addition to the two skew operations, the image is scaled and interpolated in both the X and Y directions. Scaling and interpolation are computationally costly steps, particularly when performed in the vertical direction, thereby slowing the image screening process. Also, if interpolation is performed before Y skew, then many more data points must be processed, which slows down image processing speed. On the other hand, having more data points is desirable in that it reduces the reduces the step size of the jagged stair steps resulting from Y skew.

Interpolation also dramatically reduces the jagged pixel edges that are apparent in many digital halftones, as well as helping to prevent ragged and broken dots, also known as "moon crater dots" in the final screened halftone, which can result when a halftone dot straddles a high contrast pixel transition. The process of interpolation is well known to those skilled in the art of digital signal processing. In effect, interpolation increases the effective sampling rate of input data by fitting the best curve to the data with frequencies below the Nyquist limit.

SUMMARY OF THE INVENTION

Image rotation systems suffer speed limitations because image rotation cannot be performed using only the pixels in the current horizontal scan line of the input image. That is, any given scan line of the rotated output image can conceivably contain pixels drawn from any of the other scan lines of the original non-rotated input image. However, image processing is most efficient when the processing is performed in horizontal scan line streams, i.e., where each pixel along a scan line of output pixels corresponds to pixels along a scan line of input pixels. Thus, it is desirable to provide an image rotation system in which most of the complex processing is performed in the horizontal scan line stream, and very little processing is performed in the vertical or non-horizontal scan line stream direction.

Accordingly, the present invention is embodied in a system method and apparatus for rotating an image in which the non-horizontal scan line stream processing is performed prior to interpolation, scaling and screening. For example, a corrected horizontal interpolation step, after Y skew, is performed at a compensating angle to be somewhat equivalent to having been performed before Y skew, and is performed using horizontal scan line streams. In addition, the present invention is embodied in a system wherein vertical image processing, i.e., vertical interpolation, and fine vertical skew adjustment is performed using horizontal scan line streams.

In particular, an image rotation system comprises three modules in which the first module carries the main burden of non-stream processing, and has a relatively simple processing function. The output of the first module is a continuous horizontal scan line stream, which passes smoothly through the second and third modules, which have much more complex image processing functions, in order to achieve a rotated output image.

I. The Y skew module: 90 degree rotate and Y skew

The Y skew module spatially transforms the input image so that each scan line of its output image corresponds to a scan line of the final image. Thus, it rotates the image by a multiple of 90 degrees to the closest quadrant, and also performs a rough Y skew operation. Rotation in 90 degree increments is well understood to those skilled in the art. Since the rough Y skew is performed before any interpolation, scaling or screening, relatively fewer pixels are required to be processed along the vertical, or non-stream direction.

The Y skew operation shifts each column of pixels up or down an integer number of pixels. It is called "rough" because it is preformed before any interpolation. Thus, the rough Y skew operation can increase the roughness of pixel edges. A perfectly smooth horizontal line, for example, is transformed into a jagged staircase with relatively larger steps, as compared to the relatively smaller steps size which would result from performing Y skew after interpolation. A rough Y skew step has fewer pixels to process, a particular advantage when processing pixels in the vertical, i.e., the non-horizontal scan line direction.

II. The interpolation module: interpolation and refine Y skew

Phase 1: interpolate 2× in the corrected X direction.

Phase 2: interpolate 4× in the Y direction and perform fine Y skew correction.

Phase 3: interpolate 2× in the X direction.

The interpolation module performs the X and Y direction interpolation and refines the rough Y skew in a fine Y skew adjustment step. However, pixel processing in the interpolation module is performed using horizontal scan line streams. That is, although the interpolation module achieves a Y direction interpolation and a Y direction fine skew adjustment, image pixel processing is performed using only sequential horizontal scan line streams.

The horizontal interpolation is divided into two phases, a first phase being a corrected 2× interpolation, and a third phase being a non-corrected 2× interpolation. In between, a second phase, a 4× interpolation in the Y direction and a fine Y skew correction is performed.

III. The X skew module: X skew

The X skew module performs a conventional X skew. Thereafter, anamorphic scaling, and screening is performed. Optionally, the third phase of the interpolation module, i.e., 2× horizontal interpolation, may be performed in the X skew module.

Each of the above three modules, rough Y skew, interpolation and X skew, can be implemented in special purpose image processing hardware, or in software using the microcompiler techniques taught in the above cited copending patent application.

Viewed differently, the present invention solves the dilemma of whether to skew first and interpolate later (disadvantage: larger jagged stair steps), or to interpolate first and skew later (disadvantage: many additional pixels to skew). In the present invention, an image is skewed first and then interpolated later, but in such manner that the later interpolation is equivalent to having been performed earlier, and uses substantially continuous horizontal scan line streams. Thus, the advantages of having fewer pixels to skew and smaller jagged stair steps, are both retained.

BRIEF DESCRIPTION OF THE DRAWINGS

FIGS. 3A through 3G show various original, intermediate, and final images generated by the use of the present invention. Specifically.

DETAILED DESCRIPTION

Figure 1:
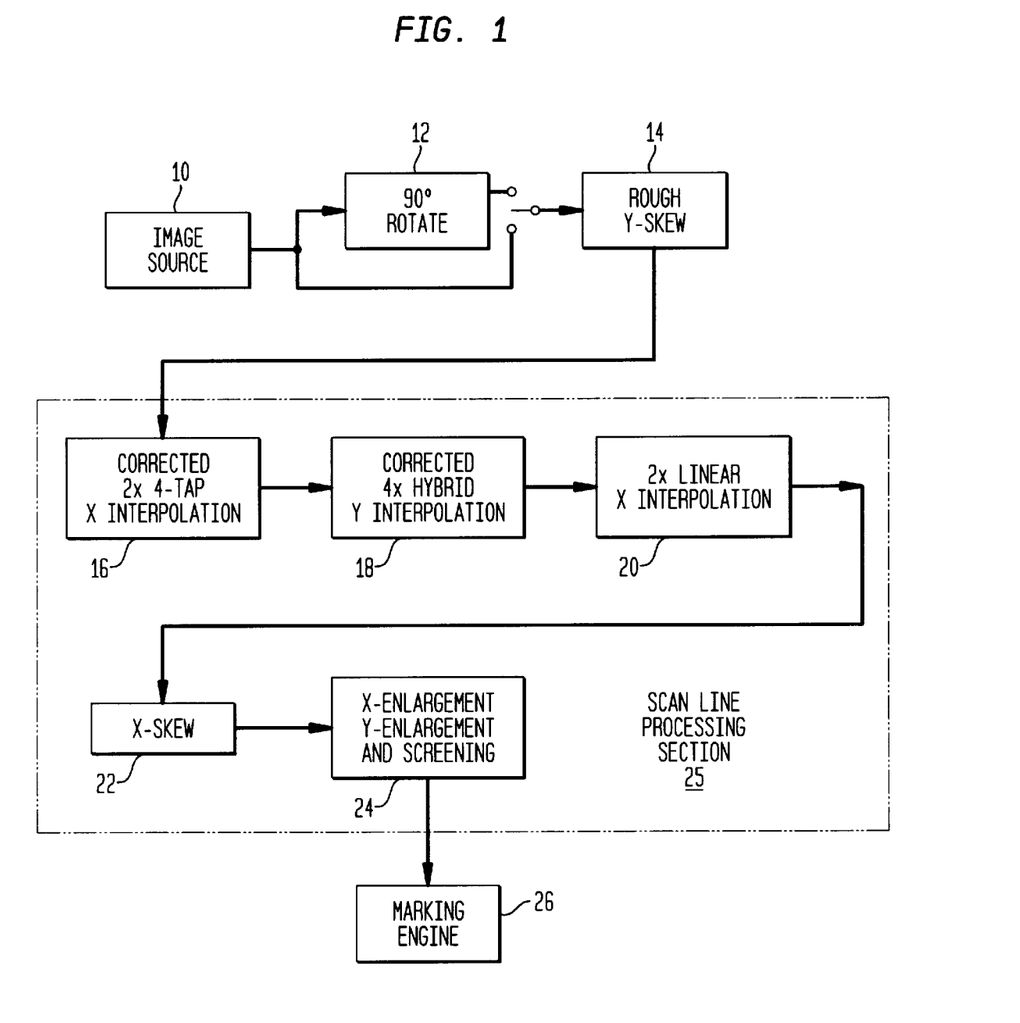
FIG. 1 is a block diagram of a system embodying the present invention.

FIG. 1 shows an image processing system in accordance with the present invention. A stored image source 10 is typically obtained by scanning a plurality of input points of an original of said image for reading a plurality of input image pixels corresponding to the original image into a memory for storage. The stored image source 10 is presented to the system, which is rotated and screened by modules 12, 14, 16, 18, 20, 22 and 24, and the resulting image recorded by marking engine 26. As indicated above, image rotation requires at least some non-horizontal scan line processing. In the present invention, modules 12 and 14 carry out the non-horizontal scan line processing. The output of module 14 is a continuous horizontal scan line stream, which passes smoothly through the scan line processing section 25. Each of the modules 12, 14, 16, 18, 20, 22 and 24, may be implemented in software or in specialized hardware, or in combination.

Figure 3A:
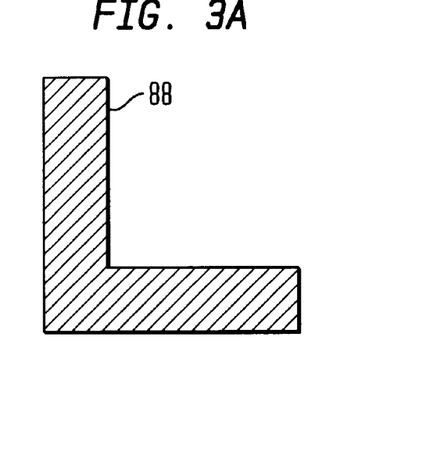
FIG. 3A is a sample input image, prior to any geometric transformation.
Figure 3B:
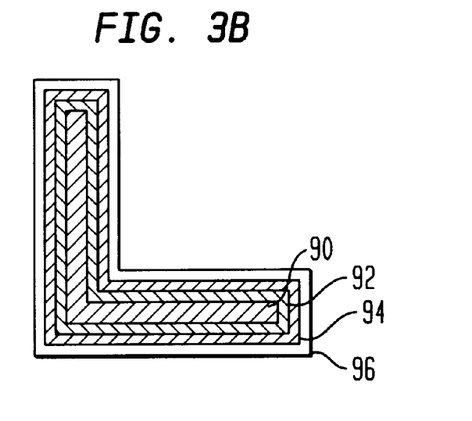
FIG. 3B is an interpolated input image, with an interpolation factor of 4 in both the X and Y directions (prior art.).

A typical stored image source 10 is shown in FIG. 3A, in which black pixels 88 form an "L" shape. It is the purpose of the present invention to perform image rotation and image interpolation tasks. An example of image interpolation without rotation is shown in FIG. 3B. In this example, the amount of interpolation is 4× in both the X and Y directions. Thus, there are four levels of shading other than white, depicted as quarter tone pixels 96, half tone pixels 94, three quarter tone pixels 92, and black pixels 90. The transition from black to white is smoothed by the inclusion of intermediate gray shade pixels. For most images, the interpolation process is highly desirable in eliminating the "stair-step" or "jagged" appearance of images in which the boundaries of the individual pixels can be seen.

As used herein, the convention 2× X means to interpolate 2 times (2 times the pixels in the X direction), and 4× Y means to interpolate 4 times (4 times the pixels in the Y direction).

Module 12 optionally rotates the image by a multiple of 90 degrees, by conventional processes so that the range of rotation may be bounded, such as for angles between −45 to 45 degrees. If there is a 90 or 270 degree rotation, then the Y skew can be performed as an X skew prior to rotation. Algorithms for X skew are well known and efficient.

Figure 3C:
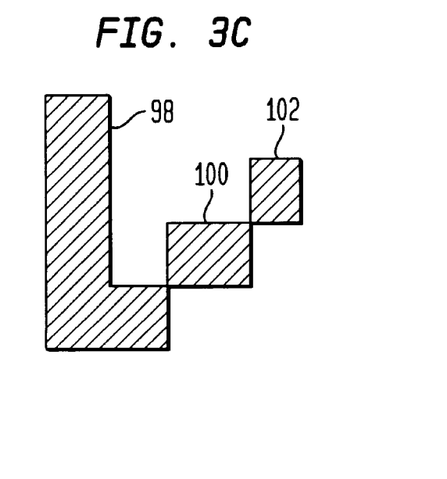
FIG. 3C illustrates the effect of input image processing by a rough Y skew operation in accordance with the present invention (the output of reference 14 in FIG. 1).
Figure 4:
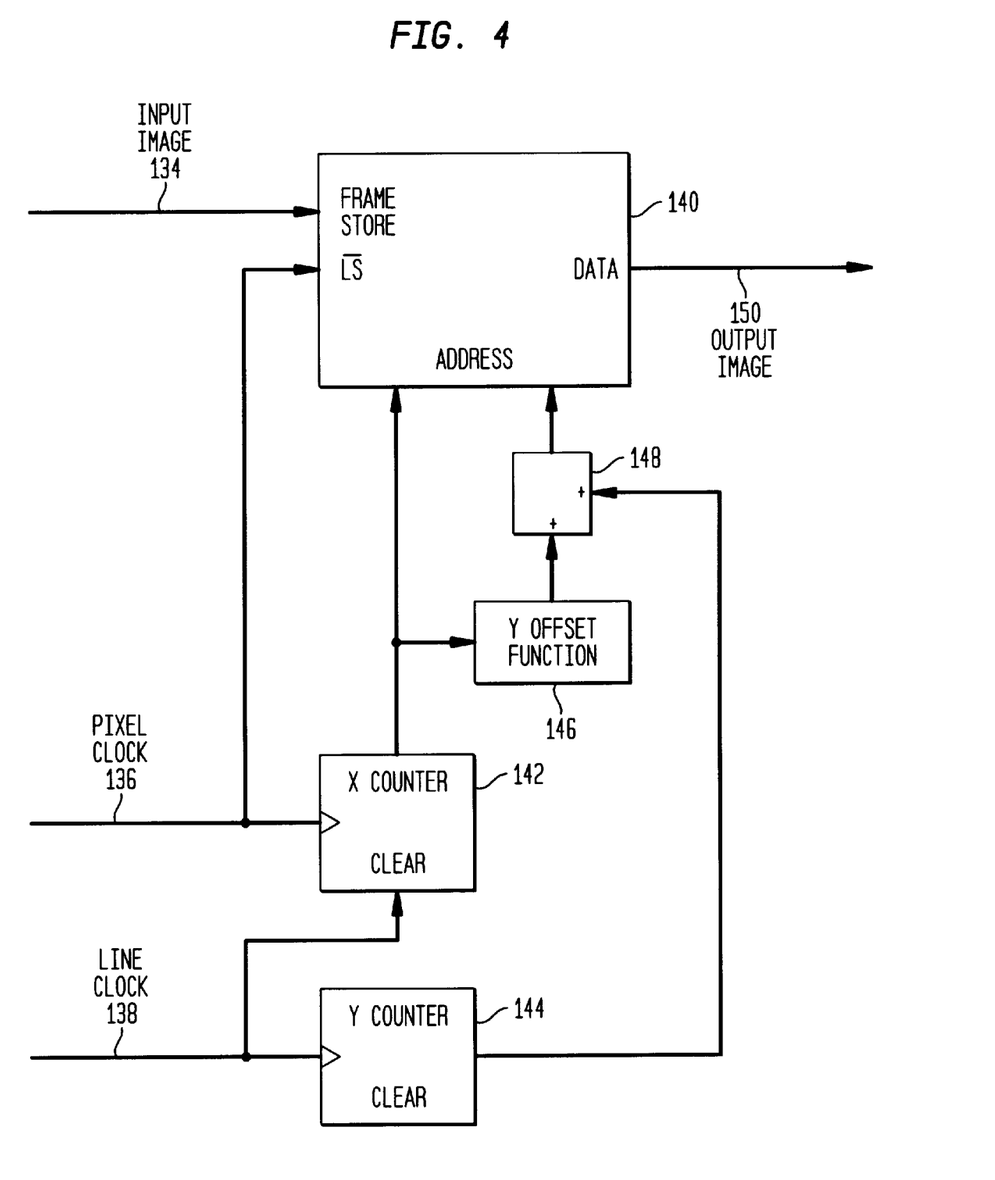
FIG. 4 is a block diagram of a rough Y skew processor, used in conjunction with the present invention, reference 14 in figure 1.

Module 14 performs a rough Y skew operation. A hardware embodiment of module 14 is shown in FIG. 4. The result of processing the image source 10 as typified by FIG. 3A is depicted in FIG. 3C. The "L" shape has been broken by sharp whole pixel jumps into three regions 98, 100, and 102. The rough Y skew closely approximates the desired Y skew transformation, but the restriction to whole pixel steps creates local positional errors, visible as stair steps.

Figure 3D:
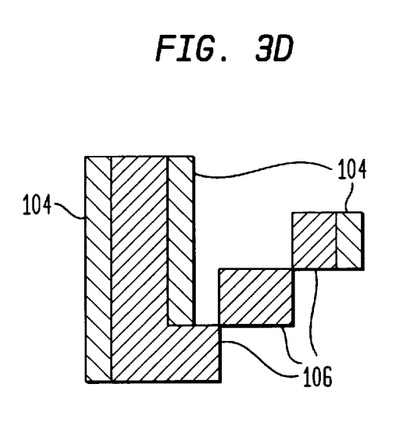
FIG. 3D illustrates the effect of further processing by corrected horizontal interpolation in accordance with the present invention (the output of reference 16 in FIG. 1).

Module 16 performs the first of three smoothing steps, designed to perform image interpolation while also reducing the local positional errors introduced by module 14. The first two of the three smoothing steps are specialized or "corrected" interpolation processes. Specifically, module 16 performs a corrected 2× X interpolation process, the result of which is shown in FIG. 3D. The image consists of black pixels 106 and half tone pixels 104. It is worth noting that in a corrected 2× X interpolation process, half tone pixels 104 only appear at the left and right edges of the original "L" shape, rather than the left and right edges of each of the individual regions 98, 100, and 102, as would have been the case if a non-corrected 2× X interpolation had been applied.

Module 18 performs the second of the specialized smoothing steps, a corrected 4× Y interpolation. Continuing the example, the result of module 18 appears in FIG. 3E. The image consists of quarter tone pixels 114, half tone pixels 112, three quarter tone pixels 110, and black pixels 108. On horizontal edges, four steps appear in the transition zone from white to black, as a result of the 4× Y interpolation, while only two such steps appear for vertical edges, just as in FIG. 3D. It should also be noted that the correction resulting from performing the 4× Y interpolation is that the height of the jagged-edged stair steps at the boundaries between individual shifted pixels is one fourth the size as in FIG. 3D. If 4× Y interpolation had been applied without the correction, while the horizontal edges would have been smoothed with four levels of gray, the height of the stair steps would have been just as large as in FIG. 3D.

Figure 3E:
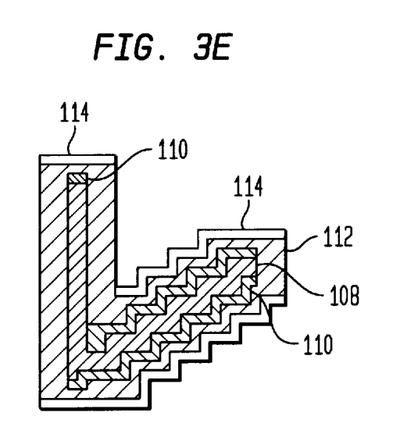
FIG. 3E illustrates the effect of further processing by corrected vertical interpolation in accordance with the present invention (the output of reference 18 of FIG. 1).
Figure 3F:
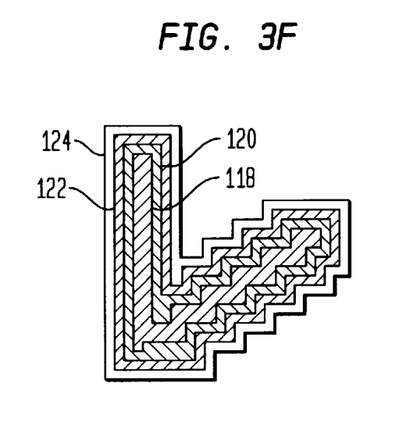
FIG. 3F illustrates the effect of yet further processing by horizontal interpolation in accordance with present invention (the output of reference 20 in FIG. 1). Finally.

Module 20 performs the third and final smoothing step, a 2× X interpolation. Correction could be applied at this point, to further reduce the jaggedness of the stair steps, but further reduction is not necessary, and is therefore omitted so as not to slow down image processing speed. The output of module 20 of FIG. 1 is illustrated in FIG. 3F, in which four steps of gray appear on all pixel edges. Again, the image is composed of quarter tone pixels 124, half tone pixels 122, three quarter tone pixels 120, and black pixels 118.

Figure 3G:
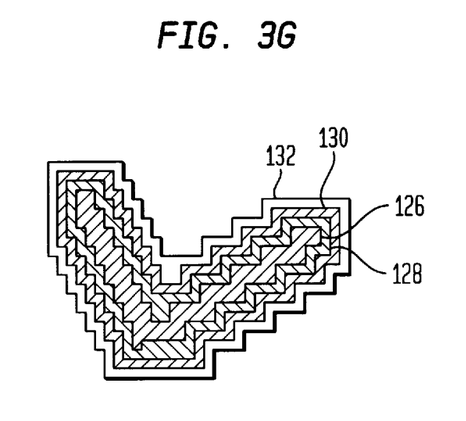
FIG. 3G illustrates the result of X skew processing used in conjunction with the present invention (the output of reference 22 of FIG. 1).

Module 22 performs a conventional X skew operation, essentially delaying each image scan line by the appropriate delay. For example, X skew could be performed by adding an offset dependent on the Y coordinate, to the X coordinate of a memory access in a line buffer. FIG. 3G shows the result of a conventional X skew operation, in which the image again consists of quarter tone pixels 132, half tone pixels 130, three quarter tone pixels 128, and black pixels 126. The image is now both rotated by the desired angle and interpolated by a factor of 4 in each of the X and Y dimensions.

It is important to note that the image sequence portrayed in FIGS. 3A through 3G is somewhat stylized for simplification. Specifically, the interpolation filter response may be slightly different than shown, particularly at the corners. In addition, while FIG. 3A contains only black and white pixels, it is far more typical for image sources to contain pixels of intermediate gray shades. The figures are, however, useful to illustrate the operation of the individual modules 14, 16, 18, 20 and 22, and how they cooperate to produce the desired result of simultaneous image rotation and image interpolation.

Finally, module 24 performs X enlargement, Y enlargement, and image screening operations. A system for enlarging and screening an image is described in the cited copending patent application.

FIG. 4 is a block diagram of a rough Y skew processor comprising frame store 140, X address counter 142, Y address counter 144, adder 148 and Y address function generator 146. Pixel clock 136 is coupled to the chip select signal input of frame store 140, and also to the clock input of the X counter 142. The output of the X counter 142 serves as the low order bits of the address presented to frame store 140, and also as the input to Y offset function generator 146. The line clock 138 is coupled to the clock input of Y counter 144, and also to the clear input of X counter 142. The value of the Y offset function generator output to adder 148 for a given X address is the number of pixels that the column addressed by that X address should be shifted. Thus, Y offset function 146 computes the same function for Y skew in the vertical direction as shift X function in the horizontal direction, described above for X skew. That is, Y skew is performed by adding an offset to the Y coordinate in adder 146 dependent on the X coordinate from X counter 142 of a memory access in frame store 140.

In operation, an input image 134 is loaded into frame store 140, which must be large enough to store the entire input image. An alternate embodiment to the frame store 140, is a circular buffer, in which the amount of memory required would be less. After the input image 134 is stored in frame store 140, the Y skewed output image 150 is clocked out as a sequence of horizontal scan lines. At the beginning of each scan line, the line clock 138 clears X counter 142. The X counter increments with each successive pixel. Adder 148 sums the output of Y counter 144 to the output of the Y offset function generator 146, resulting in the high order bits of the address presented to frame store 140.

The Y offset function generator 146 is preferably realized as a look up table. Function generator 146 is programmed to produce a Y skew equal to the tangent of the desired angle of rotation. The output of Y offset function generator 146 is added to the Y counter 144 output in adder 148 to form the higher order address bits to frame store 140. The resulting output image 150 from frame store 140 is a rough Y skew of the input image 134. For example, if the input image 134 is as depicted in FIG. 3A, the output image 150 will appear as in FIG. 3C.

The amount of skew, ys, is equal to the tangent of the angle of rotation. Column number x is shifted by floor (floor (x/16)·16·ys)+floor ((x mod 16)·ys)

pixels, where floor is the mathematical term for the smallest integer not larger than the argument (e.g. the floor of +3.12 is +3, while the floor of −3.12 is −4). The Y skew operation may also be realized in software. Each segment of 16 pixels has the same pattern of shifts, which makes the use of the high speed microcompiler techniques, described in the cited copending patent application, easier. Thus, an algorithm for Y skewing an image is as follows. The source image im[x,y] is given in an array (which corresponds to the entire image being stored in RAM). The following algorithm generates a single scan line of the first intermediate image:

To generate scan line y of intermediate image 1, stored in mid1[x]:

x=0
    while (x<width of image)
      y1=y+floor (x·ys)
      mid1[x+0]=im[x+0, y1+floor (0·ys)]
      mid1[x+1]=im[x+1, y1+floor (1·ys)]
      mid1[x+2]=im[x+2, y1+floor (2·ys)]. . .
      mid1[x+15]=im[x+15, y1+floor (15·ys)]
      x=x+16
    end while The sequence of mid[x+ . . . ]=im[x+ . . . ] operations is constant for a given value of ys, and thus can be microcompiled into very efficient code, using the techniques taught in the cited patent application. Other techniques that do not require the entire original image to fit in RAM, well known to those skilled in the art, may be used to Y skew an image.

Figure 5:
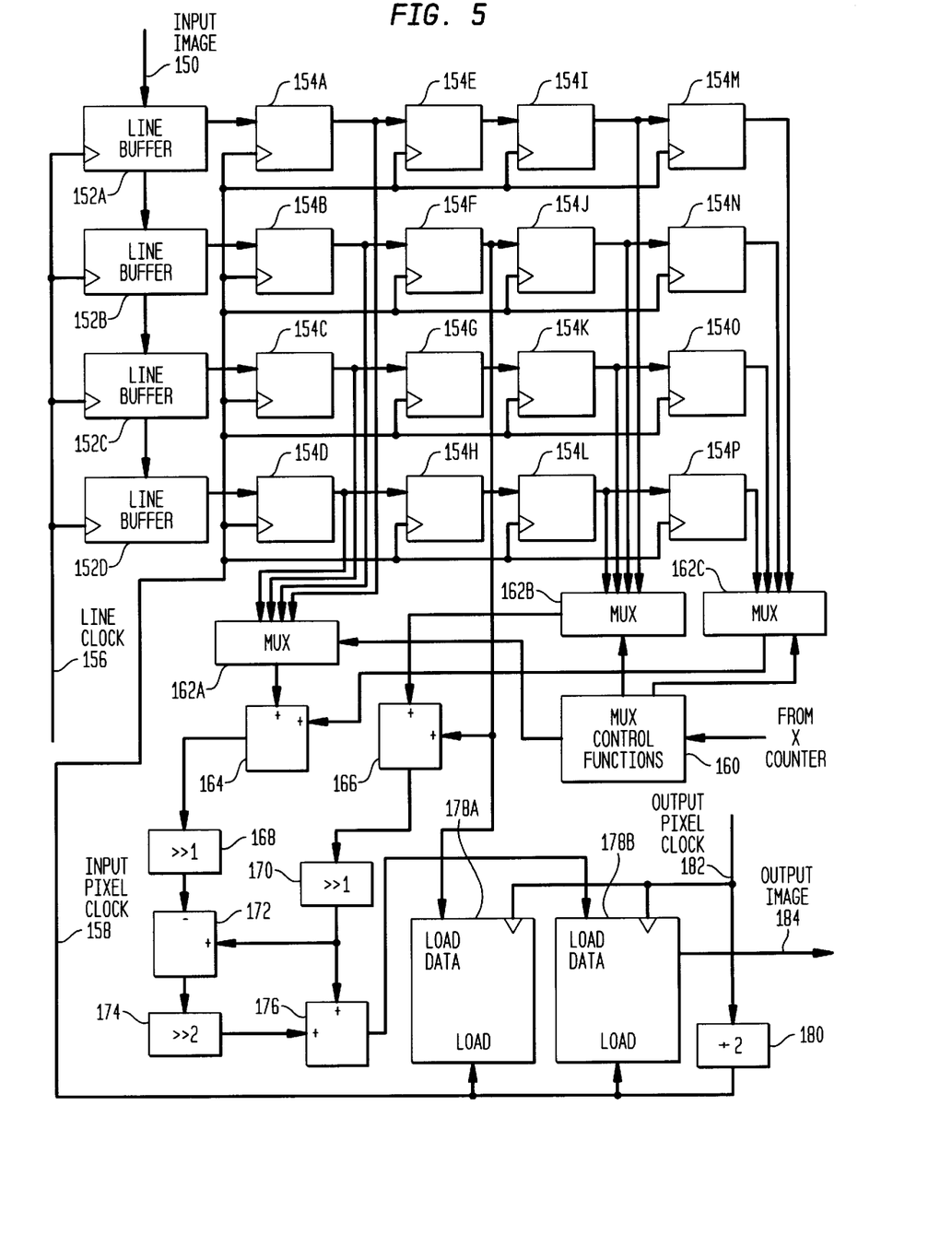
FIG. 5 is a block diagram of a corrected horizontal interpolation processor in accordance with the present invention, reference 16 in FIG. 1.

FIG. 5 is a block diagram of a corrected 2× X interpolation processor. Input image 150, the rough Y skewed image from the previous Y skew module, is loaded into successive line buffers 152A, 152B, 152C and 152D. Thus, line buffers 152A–D contain a sliding "window" of the same width as the input image 150, and four lines deep. Each strobe of line clock 156 advances the window by one scan line, transferring the line contained in each line buffer to the next line buffer in sequence. The contents of line buffers 152A–D are in turn transferred into shift registers 154A–P, responsive to input pixel clock 158. For example, pixels from line buffer 152A are successively transferred to shift registers 154A, 154E, 154I, and 154M. Similarly, pixels from line buffer 152B are transferred to shift registers 154B, 154F, 154J, and 154N, while pixels from line buffer 152C are transferred to shift registers 154C, 154G, 154K, and 154O, and pixels from line buffer 152D are transferred to shift registers 154D, 154H, 154L, and 154P. Thus, shift registers 154A–P collectively store a four by four pixel window of the input image 150. Since the apparatus of FIG. 5 will be performing a 2× interpolation, the number of output pixels will be twice the number of input pixels. Accordingly, the output pixel clock is twice the frequency of the input clock. Clock divider 180 generates input pixel clock 158 by dividing the output pixel clock 182 in half. Thus, the circuit of FIG. 5 generates two output pixels for each input pixel in the horizontal dimension.

From the four by four pixel window stored in shift registers 154A–P, four pixels are chosen, as the output of multiplexers 162A, 162B, 162C, and the output of shift register 154F. These four pixels have the important property that they all correspond to the same scan line of source image 10. Multiplexers 162A–C choose the correct pixels under control of mux (multiplexer) control functions 160, which generates the proper control signals responsive to the current X address, for example as obtained from X counter 142 in FIG. 4. Specifically, multiplexer 162A chooses one of the pixels presented on the outputs of shift registers 154A–D. Similarly, multiplexer 162B chooses from the outputs of shift registers 154I–L, and multiplexer 162C from the outputs of shift registers 154M–P. The output of shift register 154F is always used directly, without passing through a separate multiplexer to select a pixel from the column corresponding to shift registers 154E–H.

The mux control signal for multiplexer 162A will be based on shift (x)—shift (x−1), where shift (x) is defined as the amount by which column x is shifted, as above. Similarly, the signal for multiplexer 162B will be based on shift (x)—shift (x+1), and the signal for multiplexer 162C will be based on shift (x)—shift (x+2). Mux control functions 160 are best implemented as a look up table, optionally sharing a memory circuit with Y offset function 146 from FIG. 4.

By way of definition, x0 is the output of multiplexer 162A, x1 is the output of shift register 154F, and x2 and x3 are the outputs of multiplexers 162B and 162C respectively. Then, functional blocks 164, 166, 168, 170, 172, 174 and 176 compute the value of $$\frac{-x0 + (5 \cdot x1) + (5 \cdot x2) - x3}{8},$$

which is presented as the output of adder 176, which is the desired pixel interpolated between pixels x1 and x2. The functional blocks consist of adders 164, 166, and 176, subtractor 172, shift right one bit shifters 168 and 170, and shift right two bit shifter 174, which form a 4-tap FIR (finite impulse response) interpolation filter.

In binary arithmetic, to shift right one bit is to divide by 2, while to shift right two bits is to divide by 4. To form the above value of the interpolated output pixel, x0 and x3 are added in adder 164, and the result divided by 2 in one bit right shifter 168, while x1 and x2 are added in adder 166, and the result divided by 2 in one bit right shifter 170. The outputs of shift right one bit shifters 168 and 170 are added in adder 172 and the result divided by 4 in shift right two bit shifter 174. The output of shift right two bit shifter 174 is added to the output of shift right one bit shifter 170 in adder 176 to form the desired interpolated pixel. The equation above, which provides the interpolated pixel value between x1 and x2, is a weighting function wherein the neighboring pixels x1 and x2 are each weighted by a factor of 5 while the more distant pixels x0 and x3 are weighted by a negative 1.

The corrected 2× X interpolation may be implemented in software. Each segment of 16 pixels has the same pattern of shifts, which makes the use of the high speed microcompiler techniques, described in the cited copending patent application, easier. Each segment of 16 pixels is constant within a 16-pixel segment, except for the last three pixels, which overlap into the next segment, and thus may have two different shift patterns, which correspond to the two possible values of shift(x+16)—shift(x). Thus, the code may again be microcompiled into two segment routines. An outer loop selects between the two segment routines as needed. Each time a segment routine is called, it interpolates a 16-pixel segment of the input scan line into a 32-pixel segment of the output scan line.

It should also be noted that, while it would be conceptually easier to perform the interpolation prior to the Y skew, many algorithms for Y skew become much slower as the amount of image data increases. Because each interpolation phase doubles the amount of image data, the present efficient implementation delays the interpolation until after the Y skew step.

Returning to the block diagram of FIG. 5, upon each strobe of the input pixel clock 158, the pixels x1 and the output of adder 176 are loaded into the data inputs of shift registers 178A and 178B, respectively. Output pixel clock 182 clocks these two pixels in sequence through shift registers 178A and 178B, resulting in the pixels output as output image 184. Pixels of the output image 184 thus consist of alternating pixels from input image 150 and interpolated pixels as calculated by functional blocks 164–176.

Figure 2A:
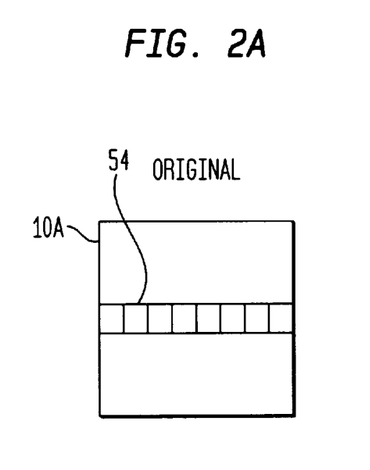
FIG. 2 shows the memory buffers and transfer operations between memory buffers to carry out the techniques of the present invention.
Figure 2B:
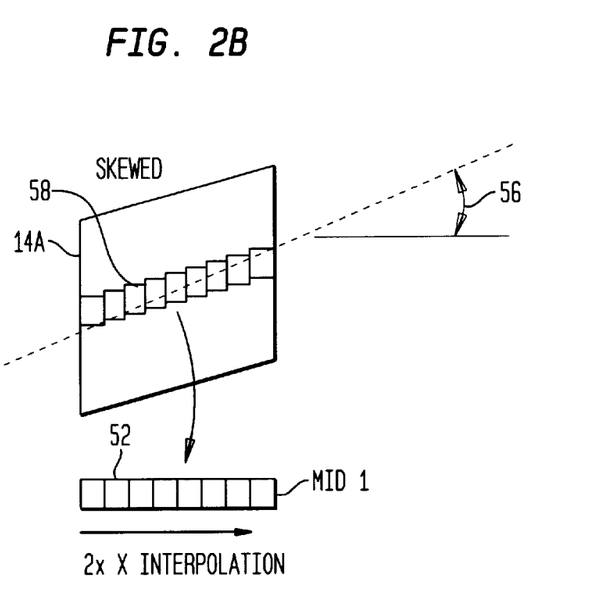

The foregoing corrected 2×0 X interpolation uses a line of pixels (x0, x1, x2 and x3) along the "original" X scan horizontal direction before Y skew, not the X scan horizontal direction after the Y skew. The resulting interpolation tends to process vertical pixel edges of the original image, and ignore vertical pixel edges created by Y skew. The process is somewhat equivalent to having interpolated before Y skew. The advantage is that there are fewer pixels to Y skew if the interpolation is done after rather than before. Because the interpolation is done at an angle other than the horizontal axis of the skewed image, the foregoing interpolation is termed a corrected 2× X interpolation. The effect is illustrated in FIG. 2A and 2B. The original image 10A in FIG. 2A is composed of scan lines such as horizontal line 54. After Y skewing, the original horizontal line of pixels 54 in FIG. 2A is now a skewed line of pixels 58 at an angle 56 from the horizontal. However, the skewed line of pixels 58 is loaded into buffer 52 where the corrected 2x X interpolation is performed. The corrected 2x X interpolation is performed therefore at an angle with respect to the horizontal scan lines of the skewed image 14A.

As a result of the process performed by FIG. 5, the output image 184 is the result of a corrected 2x X interpolation operation on input image 150. For example, an input image 150 as shown in FIG. 3C is results in an output image 184 as shown in FIG. 3D.

Figure 6:
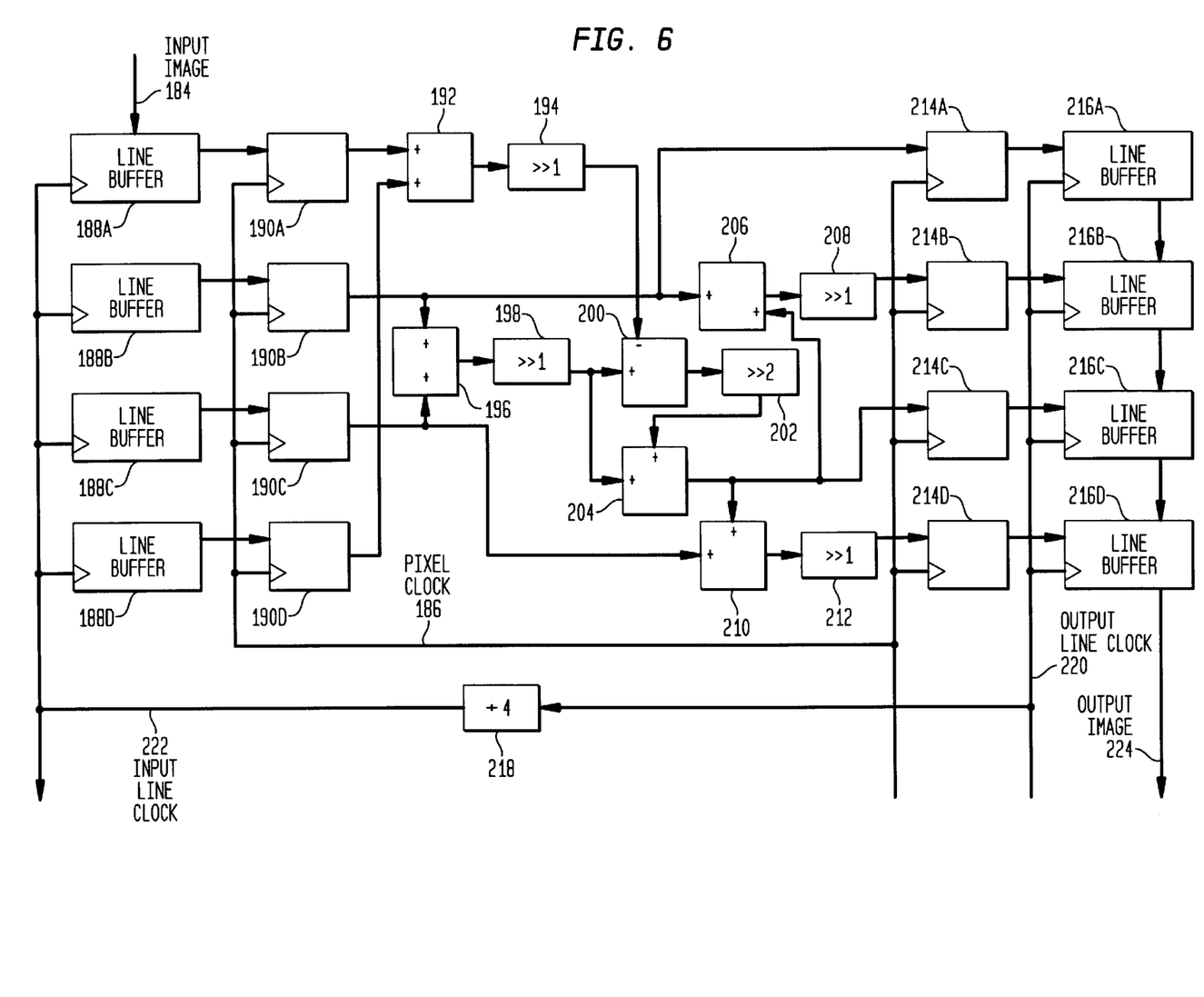
FIG. 6 is a block diagram of a vertical interpolation processor in accordance with the present invention, part of reference 18 in FIG. 1.

FIG. 6 is a schematic diagram of a 4x Y interpolation processor. Successive scan lines of input image 184, typically the output image from the previous 2x X interpolation stage, are successively shifted through line buffers 188A, 188B, 188C and 188D, responsive to input line clock 222. Since 4x interpolation generates 4 times the number of input pixels, clock divider 218 generates input line clock 222 by dividing output line clock 220 by four. Thus, the circuit of FIG. 6 generates four output scan lines of output image 224 for each input scan line of input image 184. The line buffers 188A–D contain a window of input image 184 that is the same width of input image 184 and is four pixels deep.

Successive pixels of each line buffer 188A, 188B, 188C and 188D are transferred to a respective shift register 190A, 190B, 190C and 190D, responsive to pixel clock 186. Thus, the outputs of shift registers 190A–D represent a four pixel tall column of pixels of input image 184. Then, functional blocks 192, 194, 196, 198, 200, 202 and 204 perform a similar filtering operation as functional blocks 164, 168, 166, 170, 172, 174 and 176 respectively of FIG. 5, producing an interpolated pixel intermediate to the outputs of shift registers 190B and 190C as the output of adder 204.

Specifically, if the output pixel values of shift registers 190A, 190B, 190C and 190D are y0, y1, y2 and y3 respectively, then the output of adder 204 is an interpolated pixel given by $$\frac{-y0 + (5 \cdot y1) + (5 \cdot y2) - y3}{8},$$

Adder 206 and shift right one bit shifter 208 comprise an averaging circuit to produce a pixel interpolated between the output of shift register 190B and the output of adder 204. Similarly, adder 210 and shift right one bit shifter 212 comprise an averaging circuit produce a pixel interpolated between the output of adder 206 and the output of shift register 190C. Upon each strobe of pixel clock 186, a column of pixels consisting of the outputs of shift register 190B, shifter 208, adder 204, and shifter 212 are loaded into shift registers 214A, 214B, 214C and 214D, respectively. Pixels from shift registers 214A, 214B, 214C and 214D are then loaded successively into line buffers 216A, 216B, 216C and 216D, respectively, again responsive to pixel clock 186.

The operation of clock divider 218 results in four scan lines of output image 224 being calculated and loaded into line buffers 216A–D simultaneously. Then, output line clock 220 will cause each of the line buffers 216A–D to be output successively, producing four scan lines of output image 224, before the next strobe of input clock 222, which loads another scan line of input image 184 and repeats the process. Thus, the output image 224 consists of alternating single scan lines of input image 184 followed by three consecutive interpolated scan lines as calculated by functional blocks 192–212.

As a result of the process performed by FIG. 6, the output image 224 is the result of a 4x Y interpolation operation on the input image 184. The output image 224 has much smoother transitions between pixels than input image 184, but has just as large a vertical positioning error, resulting in an image 224 with equally objectionable stair steps as input image 184.

Figure 7:
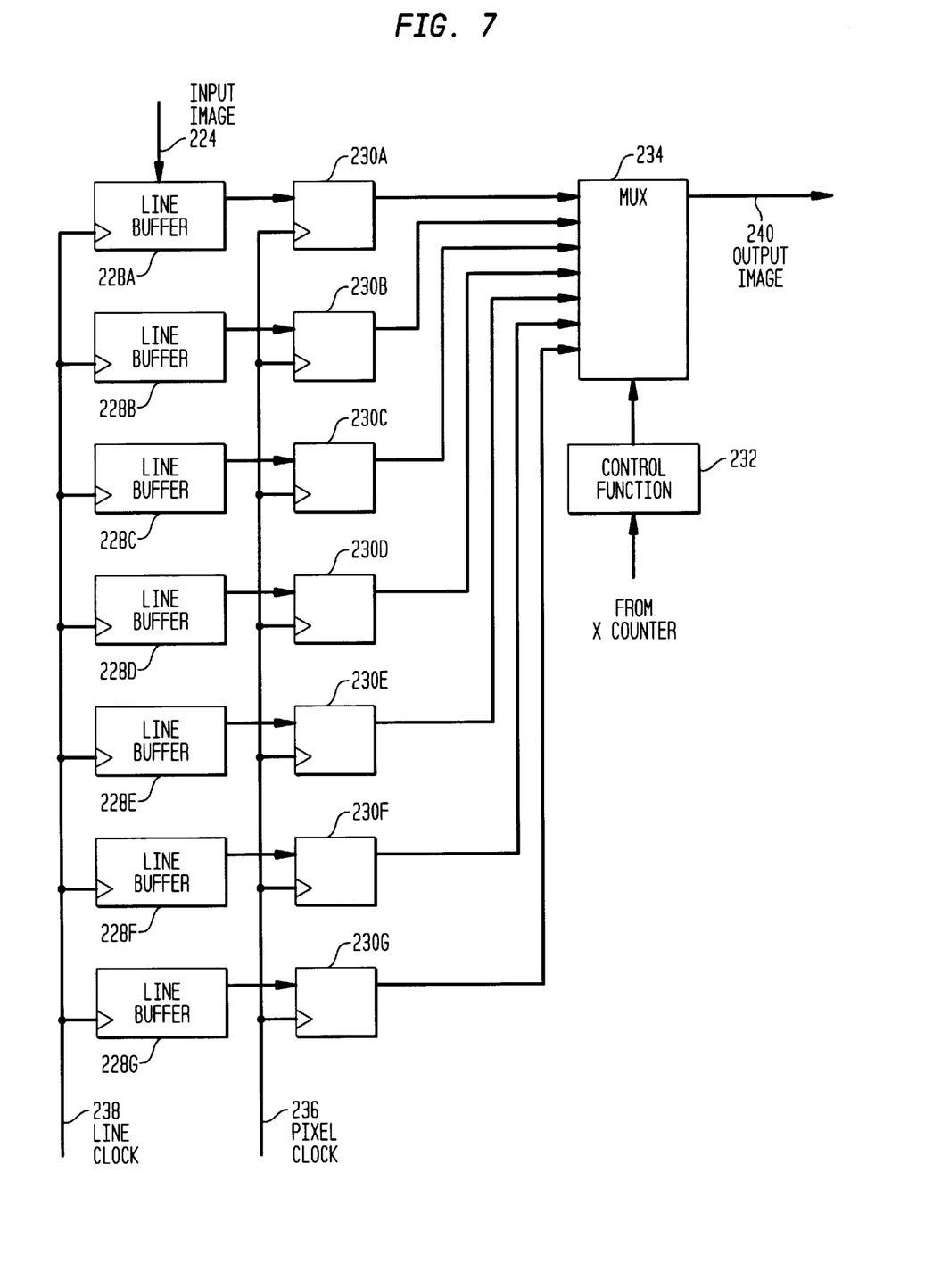
FIG. 7 is a block diagram of a correction processor for vertical interpolation in accordance with the present invention, part of reference 18 in FIG. 1.

FIG. 7 is a block diagram of a correction processor for 4x Y interpolation. It accepts as an input image 224 the result image of the previous 4x Y interpolation processing step, and results in an output image 240 in which the vertical positioning error is reduced by a factor of four. Successive scan lines from input image 224 are transferred into line buffers 228A, 228B, 228C, 228D, 228E, 228F and 228G, responsive to line clock 238. Successive pixels from line buffers 228A–G are transferred to respective shift registers 230A, 230B, 230C, 230D, 230E, 230F and 230G responsive to pixel clock 236. Thus, the outputs of shift registers 230A–G represent a window one pixel wide by seven pixels tall of input image 224. All seven such pixels are presented as inputs to multiplexer 234, which selects one such pixel responsive to control function 232, and presents it as an output pixel of output image 240. Control function 232 is best implemented as a lookup table responsive to an X counter, containing a function based on 4·shift (floor (x/2))–floor (floor (x/32)·64·ys)–floor ((x mod 32)·2·ys)

as described above. Thus, the circuit of FIG. 7 shifts each column of pixels of input image 224 by a whole number of pixels chosen so as to minimize the vertical positional error of the columns as they appear in output image 240. Originally, the rough Y skew produced the relatively larger steps of a jagged edged staircase since there was only one larger pixel per step. Now, after 4x Y interpolation, there are 4 smaller pixels instead of 1 large one, so the correction processor refines the Y skew by shifting each vertical column of pixels up or down to produce smaller staircase steps. The output image 240 has vertical positional error a factor of four smaller than that of input image 224.

Figure 2C:
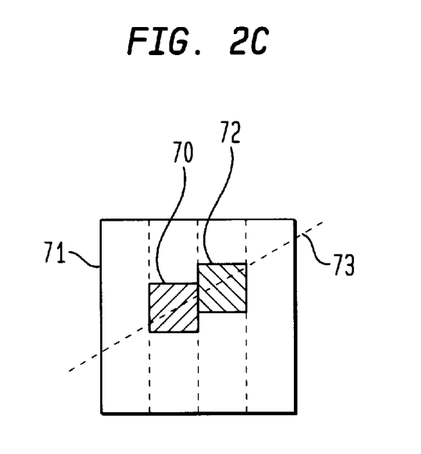
Figure 2D:
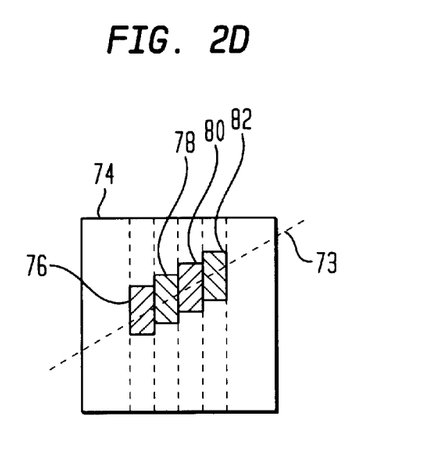

FIGS. 2C and 2D illustrate the effect of the 4x Y interpolation and fine Y skew adjustment. A detail of the rough skewed image 71 in FIG. 2C contains a dark areas composed of larger black pixels such as in areas 70 and 72 along a sloped line 73. After the 4x Y interpolation and fine skew adjustment, the y columns are more accurately positioned. In particular, column 76 is shifted downward relative to column 78, whereas column 82 is shifted upward with respect to column 80. The effect is to reduce the size of the jagged staircase steps occurring along the sloped line 73.

The fine Y skew adjustment operation may also be realized in software. Again, each segment of 32 pixels has the same pattern of shifts, which makes the use of the high speed microcompiler techniques, described in the cited copending patent application, easier.

Thus, the circuits in FIGS. 6 and 7 together implement a corrected 4x Y interpolation process, as in accordance with module 18 of FIG. 1. For example, the result of processing the image of FIG. 3D by the combined circuit of FIGS. 6 and 7 is shown in FIG. 3E. The resulting image 240 of FIG. 7 has both four times less vertical positioning error, and four times smoother transition between pixels as the input image 224.

Figure 8:
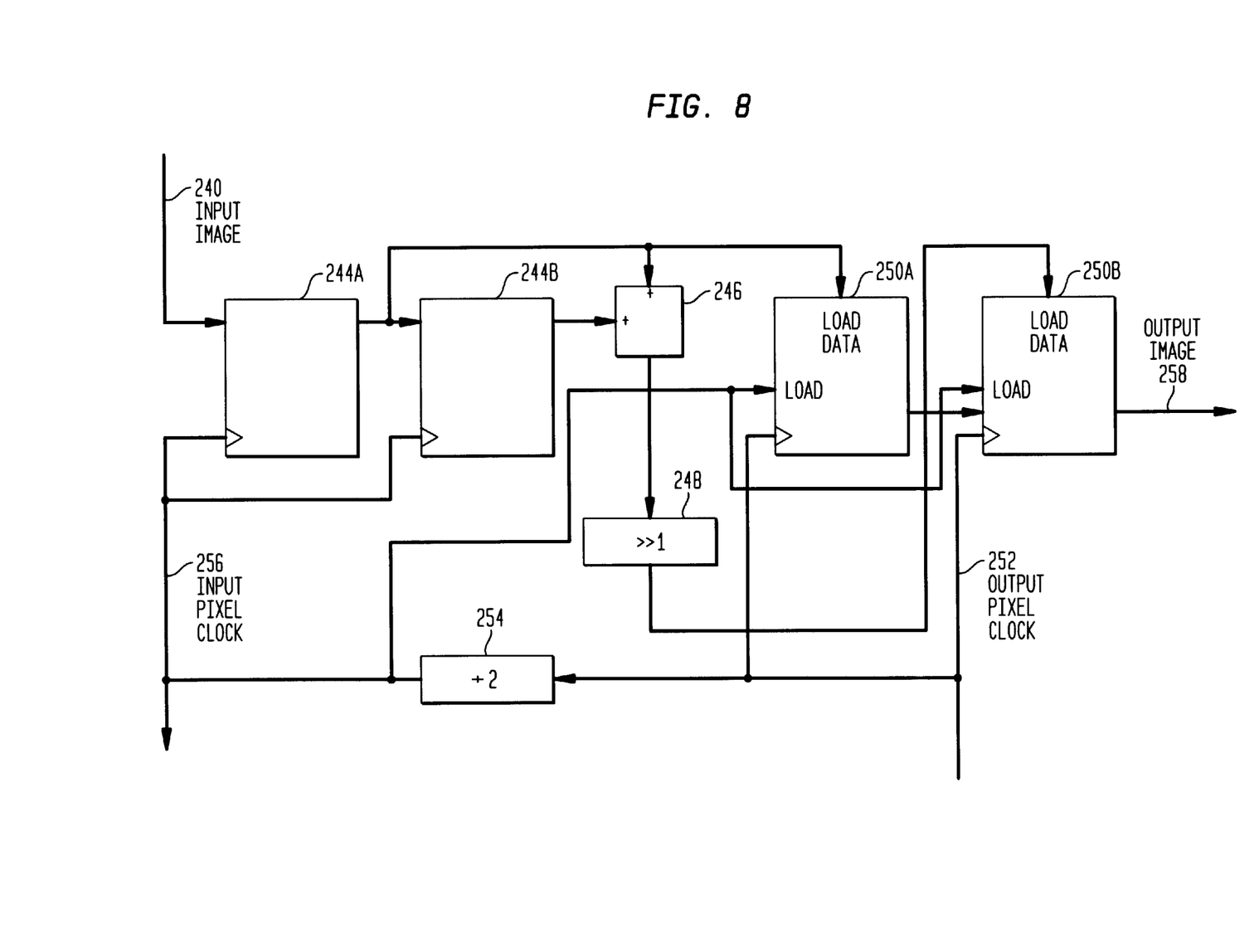
FIG. 8 is a block diagram of a horizontal interpolation processor used in conjunction with the present invention, reference 20 in FIG. 1.

FIG. 8 is a schematic diagram of a 2x X interpolation processor. Pixels of input image 240, typically from the output image of the previous 4x Y interpolation stage, are successively transferred to shift registers 244A and 244B, responsive to input pixel clock 256. In similar fashion as FIG. 5, input pixel clock 256 is derived from output pixel clock 252 by divide-by-2 clock divider 254. Thus, the circuit of FIG. 8 generates two pixels of output image 258 for each pixel of input image 240. Adder 246 and shift right one bit shifter 248 calculate an interpolated pixel intermediate (the average) between the outputs of shift registers 244A and 244B representing successive horizontal pixels. Upon each strobe of input pixel clock 256, the outputs of shift register 244A and shift right one bit shifter 248 are loaded into shift registers 250A and 250B, respectively. Then, two strobes of output pixel clock 252 transfer the two pixels to the output of shift register 250B, resulting in output image 258. Thus, pixels of output image 258 consist of alternating pixels of input image 240 and interpolated pixels as calculated by adder 246 and shifter 248.

Output image 258 is a 2× X interpolation of input image 240. For example, the input image 240 corresponding to FIG. 3E, is interpolated to form output image 258, as depicted in FIG. 3F.

The output image from the 2× X interpolation of FIG. 8 is further processed by a conventional X skew operation corresponding to module 22 of FIG. 1. The X skew, xs, can be performed simply by offsetting the input scan line. The parameters for X skew and anamorphic distortion are determined as follows:

xs=sin angle−cos angle (X skew)
xe=enlargement/(4·cos angle) (X scaling)
ye=enlargement cos angle/4 (Y scaling)

The factors of 4 are due to the fact that the second module expands the original image by a factor of 4 in each direction.

The x skew operation can be implemented by adding floor (y·xs)

to the input pointer before calling the X scaling and screening routine (as taught in the above cited copending patent application). In this case, y represents the scan line number of the output of the second module, rather than the scan line number of the input or output image. The result is the image shown in FIG. 3G, in which both the desired rotation and interpolation have been performed.

What is claimed is:

1. In a system for rotating a stored image by a given angle of rotation, a method comprising:

scanning a plurality of input points of an original of said image for reading a plurality of input image pixels corresponding to said image, wherein said scanning defines a horizontal direction as the direction of said scanning forming a plurality of horizontal scan lines of input image pixels, and defines a vertical direction as substantially perpendicular to said horizontal direction;

storing said plurality of input image pixels in a memory to form said stored image, wherein said input image pixels are stored in said memory such that adjacent Pixels in a given memory location are in substantially the same order as said plurality of input image pixels along said horizontal direction;

skewing said stored image in a vertical direction by a vertical skew to form a vertical skewed image;

interpolating said vertical skewed image to form an interpolated vertical skewed image; and skewing, said interpolated vertical skewed image in a horizontal direction by a horizontal skew to form a rotated image.

2. A method in accordance with claim 1, wherein said step of interpolating said vertical skewed image comprises;

interpolating said vertical skewed image by a factor of two to provide twice the number of pixels in a corrected horizontal direction;

interpolating said vertical skewed image by a factor of four to provide four times the number of pixels in the vertical direction; and interpolating said vertical skewed image by a factor of two to provide twice the number of pixels in the horizontal direction.

3. A method in accordance with claim 2, wherein said step of interpolating said vertical skewed image by a factor of two to provide twice the number of pixels in a corrected horizontal direction comprises:

interpolating along a line of pixels at an angle other than the horizontal axis of said vertical skewed image.

4. A method in accordance with claim 1, wherein said step of interpolating said vertical skewed image further comprises:

skewing individual vertical lines of said vertical skewed image in a vertical direction to refine said vertical skew of said vertical skewed image to reduce vertical positioning error.

5. A method in accordance with claim 1, wherein said vertical skew is proportional to the tangent of said given angle of rotation.

6. A method in accordance with claim 1, wherein said horizontal skew is proportional to the sine of said given angle of rotation times the cosine of said given angle of rotation.

7. In a system for rotating a stored image by a given angle of rotation, an apparatus comprising:

means for scanning a plurality of input points of an original of said image for reading a plurality of input image pixels corresponding to said image, wherein said scanning defines a horizontal direction as the direction of said scanning forming a plurality of horizontal scan lines of input image pixels, and defines a vertical direction as substantially perpendicular to said horizontal direction;

means for storing said plurality of input image pixels in a memory to form said stored image, wherein said input image pixels are stored in said memory such that adjacent pixels in a given memory location are in substantially the same order as said plurality of input image pixels along said horizontal direction;

means for skewing said stored image in a vertical direction by a vertical skew to form a vertical skewed image;

means for interpolating said vertical skewed image to form an interpolated vertical skewed image;

means for skewing said interpolated vertical skewed image in a horizontal direction by a horizontal skew to form a rotated image.

8. An apparatus in accordance with claim 7, wherein said means for interpolating said vertical skewed image comprises;

means for interpolating said vertical skewed image by a factor of two to provide twice the number of pixels in a corrected horizontal direction;

means for interpolating said vertical skewed image by a factor of four to provide four times the number of pixels in the vertical direction;

means for interpolating said vertical skewed image by a factor of two to provide twice the number of pixels in the horizontal direction.

9. An apparatus in accordance with claim 8, wherein said means for interpolating said vertical skewed image by a factor of two to provide twice the number of pixels in a corrected horizontal direction comprises:

means for interpolating along a line of pixels at an angle other than the horizontal axis of said vertical skewed image.

10. An apparatus in accordance with claim 7, wherein said means for interpolating said vertical skewed further comprises:

means for skewing individual vertical lines of said vertical skewed image in a vertical direction to refine said vertical skew of said vertical skewed image to reduce vertical positioning error.

11. An apparatus in accordance with claim 7, wherein said vertical skew is proportional to the tangent of said given angle of rotation.

12. An apparatus in accordance with claim 7, wherein said horizontal skew is proportional to the sine of said given angle of rotation times the cosine of said given angle of rotation.

13. In a system for rotating a stored image by a given angle of rotation, said system including scanning a plurality of input points of an original of said image for reading a plurality of input image pixels corresponding to said image, wherein said scanning defines a horizontal direction as the direction of said scanning forming a plurality of horizontal scan lines of input image pixels, and defines a vertical direction as substantially perpendicular to said horizontal direction, storing said plurality of image pixels in a memory to form said stored image, wherein said input image pixels are stored in said memory such that adjacent pixels in a given memory location are in substantially the same order as said plurality of input image pixels along said horizontal direction, skewing said stored image in a vertical direction by a vertical skew to form a vertical skewed image, skewing said stored image in a horizontal direction by a horizontal skew, an improved method for forming a rotated image comprising:

interpolating said vertical skewed image in the vertical and horizontal directions of said vertical skewed image subsequent to skewing said stored image in the vertical direction and prior to skewing said stored image in the horizontal direction.

14. A method in accordance with claim 13, wherein said step of interpolating said vertical skewed image comprises;

interpolating said vertical skewed image by a factor of two to provide twice the number of pixels in a corrected horizontal direction;

interpolating said vertical skewed image by a factor of four to provide four times the number of pixels in the vertical direction; and interpolating said vertical skewed image by a factor of two to provide twice the number of pixels in the horizontal direction.

15. A method in accordance with claim 14, wherein said step of interpolating said vertical skewed image by a factor of two to provide twice the number of pixels in a corrected horizontal direction comprises:

interpolating along a line of pixels at an angle other than the horizontal axis of said vertical skewed image.

16. A method in accordance with claim 13, wherein said step of interpolating said vertical skewed image further comprises:

skewing individual vertical lines of said vertical skewed image in a vertical direction to refine said vertical skew of said vertical skewed image to reduce vertical positioning error.

17. A method in accordance with claim 13, wherein said vertical skew is proportional to the tangent of said given angle of rotation.

18. A method in accordance with claim 13, wherein said horizontal skew is proportional to the sine of said given angle of rotation times the cosine of said given angle of rotation.

19. In a system for rotating a stored image by a given angle of rotation, said system including means for scanning a plurality of input points of an original of said image for reading a plurality of input image pixels corresponding to said image, wherein said scanning defines a horizontal direction as the direction of said scanning forming a plurality of horizontal scan lines of input image pixels, and defines a vertical direction as substantially perpendicular to said horizontal direction, means for storing said plurality of image pixels in a memory to form said stored image, wherein said input image pixels are stored in said memory such that adjacent pixels in a given memory location are in substantially the same order as said plurality of input image pixels along said horizontal direction, means for skewing said stored image in a vertical direction by a vertical skew to form a vertical skewed image, means for skewing said stored image in a horizontal direction by a horizontal skew, an improved apparatus for forming a rotated image comprising:

means for interpolating said vertical skewed image in the vertical and horizontal directions of said vertical skewed image subsequent to skewing said stored image in the vertical direction and prior to skewing said stored image in the horizontal direction.

20. An apparatus in accordance with claim 19, wherein said means for interpolating said vertical skewed image comprises;

means for interpolating said vertical skewed image by a factor of two to provide twice the number of pixels in a corrected horizontal direction;

means for interpolating said vertical skewed image by a factor of four to provide four times the number of pixels in the vertical direction; and means for interpolating said vertical skewed image by a factor of two to provide twice the number of pixels in the horizontal direction.

21. An apparatus in accordance with claim 20, wherein said means for interpolating said vertical skewed image by a factor of two to provide twice the number of pixels in a corrected horizontal direction comprises:

means for interpolating along a line of pixels at an angle other than the horizontal axis of said vertical skewed image.

22. An apparatus in accordance with claim 19, wherein said means for interpolating said vertical skewed image further comprises:

means for skewing individual vertical lines of said vertical skewed image in a vertical direction to refine said vertical skew of said vertical skewed image to reduce vertical positioning error.

23. An apparatus in accordance with claim 19, wherein said vertical skew is proportional to the tangent of said given angle of rotation.

24. An apparatus in accordance with claim 19, wherein said horizontal skew is proportional to the sine of said given angle of rotation times the cosine of said given angle of rotation.

25. In a system for rotating a stored image by a given angle of rotation, an apparatus comprising:

means for scanning a plurality of input points of an original of said image for reading a plurality of input image pixels corresponding to said image, wherein said scanning defines a horizontal direction as the direction of said scanning forming a plurality of horizontal scan lines of input image pixels, and defines a vertical direction as substantially perpendicular to said horizontal direction;

a frame store memory for storing said plurality of input image pixels to form said stored image, wherein said input image pixels are stored in said memory such that adjacent pixels in a given memory location are in substantially the same order as said plurality of input image pixels along said horizontal direction;

means for skewing said stored image in said frame store memory in a vertical direction by a vertical skew to form a vertical skewed image;

means for assembling said vertical skewed image into a data stream comprised of horizontal scan lines;

a buffer memory smaller than said frame store memory and containing a plurality of line buffers, said plurality of line buffers storing a portion of the input image stored in said frame store memory, said buffer memory coupled to receive said data stream of horizontal scan lines, and storing a portion of said data stream corresponding to a plurality of said horizontal scan lines of said vertical skewed image;

means for interpolating said portion of said data stream corresponding to said vertical skewed image stored in said buffer memory to form an interpolated vertical skewed image; and means for skewing said interpolated vertical skewed image in a horizontal direction by a horizontal skew of said data stream to form said rotated image.

26. An apparatus in accordance with claim 25, wherein said means for interpolating said portion of said vertical skewed image stored in said buffer memory comprises:

means for interpolating said portion of said vertical skewed image stored in said buffer memory by a factor of two to provide twice the number of pixels in a corrected horizontal direction;

means for interpolating said portion of said vertical skewed image stored in said buffer memory by a factor of four to provide four times the number of pixels in the vertical direction; and means for interpolating said portion of said vertical skewed image stored in said buffer memory by a factor of two to provide twice the number of pixels in the horizontal direction.

27. An apparatus in accordance with claim 26, wherein said means for interpolating said portion of said vertical skewed image stored in said buffer memory by a factor of two to provide twice the number of pixels in a corrected horizontal direction comprises:

means for interpolating along a line of pixels at an angle other than the horizontal axis of said vertical skewed image.

28. An apparatus in accordance with claim 25, wherein said means for interpolating said portion of said vertical skewed image stored in said buffer memory further comprises:

means for skewing individual vertical lines of said vertical skewed image in a vertical direction to refine said vertical skew of said vertical skewed image to reduce vertical positioning error.

29. In a system for rotating a stored image by a given angle of rotation, said system including means for scanning a plurality of input points of an original of said image for reading a plurality of input image pixels corresponding to said images wherein said scanning defines a horizontal direction as the direction of said scanning forming a plurality of horizontal scan lines of input image pixels, and defines a vertical direction as substantially perpendicular to said horizontal direction, a frame store memory for storing said plurality of input image pixels to form a stored image, wherein said input image pixels are stored in said memory such that adjacent pixels in a given memory location are in substantially the same order as said plurality of input image pixels along said horizontal direction, means for skewing said stored image in said frame store memory in a vertical direction by a vertical skew to form a vertical skewed image, means for skewing said vertical skewed image in a horizontal direction by a horizontal skew, an improved apparatus for forming a rotated image wherein the improvement comprises:

means for assembling said vertical skewed image into a data stream comprised of horizontal scan lines of said vertical skewed image;

a buffer memory smaller than said frame store memory and containing a plurality of line buffers, said plurality of line buffers storing a portion of the input image stored in said frame store memory, said buffer memory coupled to receive said data stream of horizontal scan lines, and storing a portion of said data stream corresponding to a plurality of said horizontal scan lines of said vertical skewed image; and means for interpolating the portion of said vertical skewed image stored in said buffer memory to form an interpolated vertical skewed image.

30. An apparatus in accordance with claim 29, wherein said means for interpolating said portion of said vertical skewed image stored in said buffer memory horizontal scan line streams comprises;

means for interpolating said portion of said vertical skewed image stored in said buffer memory by a factor of two to provide twice the number of pixels in a corrected horizontal direction;

means for interpolating said portion of said vertical skewed image stored in said buffer memory by a factor of four to provide four times the number of pixels in the vertical direction; and means for interpolating said portion of said vertical skewed image stored in said buffer memory by a factor of two to provide twice the number of pixels in the horizontal direction.

31. An apparatus in accordance with claim 30, wherein said means for interpolating said portion of said vertical skewed image stored in said buffer memory by a factor of two to provide twice the number of pixels in a corrected horizontal direction comprises:

means for interpolating along a line of pixels at an angle other than the horizontal axis of said vertical skewed image.

32. An apparatus in accordance with claim 29, wherein said means for interpolating said portion of said vertical skewed image stored in said buffer memory further comprises:

means for skewing individual vertical lines of said vertical skewed image in a vertical direction to refine said vertical skew of said vertical skewed image to reduce vertical positioning error.

* * * * *